United States Patent
Roden et al.

(10) Patent No.: US 6,931,441 B1
(45) Date of Patent: Aug. 16, 2005

(54) METHOD AND APPARATUS FOR MANAGING A NETWORK USING LINK STATE INFORMATION

(75) Inventors: Thomas Roden, Irvine, CA (US); Darrell Shively, El Toro, CA (US); Dan Nguyen, Westminster, CA (US); Larry Nadeau, Laguna Niguel, CA (US); Tina Truong, Foothill Ranch, CA (US); David N. Still, Santa Ana, CA (US)

(73) Assignee: Cisco Technology, Inc., San Jose, CA (US)

( * ) Notice: Subject to any disclaimer, the term of this patent is extended or adjusted under 35 U.S.C. 154(b) by 739 days.

(21) Appl. No.: 09/895,560

(22) Filed: Jun. 29, 2001

(51) Int. Cl.[7] .............................................. G06F 15/173
(52) U.S. Cl. ...................... 709/223; 709/238; 370/255; 370/256; 370/230; 713/152
(58) Field of Search ................................ 709/230, 238, 709/223; 370/216, 255, 256, 230; 713/152

(56) References Cited

U.S. PATENT DOCUMENTS

| | | | |
|---|---|---|---|
| 5,079,767 A | 1/1992 | Perlman | |
| 5,436,909 A | 7/1995 | Dev et al. | |
| 5,606,669 A | 2/1997 | Bertin et al. | |
| 5,627,766 A | 5/1997 | Beaven | |
| 5,687,168 A * | 11/1997 | Iwata | 370/255 |
| 5,706,440 A | 1/1998 | Compliment et al. | |
| 5,710,885 A | 1/1998 | Bondi | |
| 5,737,319 A * | 4/1998 | Croslin et al. | 370/255 |
| 5,796,736 A | 8/1998 | Suzuki | |
| 5,822,305 A | 10/1998 | Vaishnavi et al. | |
| 5,845,149 A | 12/1998 | Husted et al. | |
| 5,910,803 A | 6/1999 | Grau et al. | |
| 6,108,702 A | 8/2000 | Wood | |
| 6,131,119 A | 10/2000 | Fukui | |
| 6,163,529 A | 12/2000 | Nagel et al. | |
| 6,173,411 B1 | 1/2001 | Hirst et al. | |
| 6,192,053 B1 * | 2/2001 | Angelico et al. | 370/448 |
| 6,205,122 B1 | 3/2001 | Sharon et al. | |

(Continued)

OTHER PUBLICATIONS

J. Postel, "Internet Control Message Protocol, Darpa Internet Program Protocol Specification," Sep. 1981, Request for Comments: 792, http://www.ietf.org/rfc/rfc0792.txt?number=792, printed Dec. 30, 2003, pp. 1-21.

(Continued)

Primary Examiner—Wen-Tai Lin
(74) Attorney, Agent, or Firm—Hickman, Palermo, Truong and Becker LLP (57) ABSTRACT

A method is disclosed for managing a network having a plurality of network elements, where the network elements are configured to be interconnected to one another. A data structure is maintained that includes information about a link state for each network element in the plurality of network elements. The link state for each network element describes a connection between that network element and at least one other network element designated to be connected to that network element. A management policy is configured for the plurality of network elements by using link state information in the data structure to detect if any of the plurality of network elements are unreachable.

31 Claims, 6 Drawing Sheets

U.S. PATENT DOCUMENTS

| | | | |
|---|---|---|---|
| 6,219,786 B1 * | 4/2001 | Cunningham et al. | 713/152 |
| 6,347,073 B1 | 2/2002 | Hiscock et al. | |
| 6,360,333 B1 | 3/2002 | Jansen et al. | |
| 6,377,374 B1 * | 4/2002 | Davis et al. | 398/82 |
| 6,438,705 B1 | 8/2002 | Chao et al. | |
| 6,594,268 B1 * | 7/2003 | Aukia et al. | 370/400 |
| 6,650,626 B1 * | 11/2003 | Cain | 370/256 |
| 6,804,712 B1 | 10/2004 | Kracht | |
| 2001/0005358 A1 * | 6/2001 | Shiozawa | 370/228 |
| 2002/0078232 A1 * | 6/2002 | Simpson et al. | 709/238 |
| 2002/0131362 A1 * | 9/2002 | Callon | 370/216 |
| 2003/0185153 A1 * | 10/2003 | Kohler et al. | 370/230 |

OTHER PUBLICATIONS

J. Postel, "Telnet Protocol Specification," May 1983, Request for Comments: 854, http://www.ietf.org.rfc/rfc0854.txt?number=854, printed Dec. 30, 2003, pp. 1-15.

J. Postel, "User Datagram Protocol," Aug. 28, 1980, Request for Comments: 768, http://www.ietf.org/rfc/rfc0768.txt?number=0768, printed Dec. 30, 2003, pp. 1-3.

J. Case, et al., "A Simple Network Management Protocol (SNMP)," May 1990, Request for Comments: 1157, http://www.ietf.org/rfc/rfc1157.txt?number=1157, printed Dec. 30, 2003, pp. 1-34.

* cited by examiner

FIG. 1

| HOST | LINK 1 | LINK 2 |
|---|---|---|
| A | B/UP | C/UP |
| B | A/UP | D/UP |
| C | A/UP | E/UP |
| D | B/UP | F/DOWN |
| E | C/UP | F/DOWN |
| F | E/DOWN | D/DOWN |

METHOD AND APPARATUS FOR MANAGING A NETWORK USING LINK STATE INFORMATION

FIELD OF INVENTION

The present invention generally relates to managing elements of a network. The invention relates more specifically to managing elements of a network using link state information.

BACKGROUND OF THE INVENTION

Network management systems are programmatic tools, services, applications or devices that implement management functions, policies and controls on a network. In many cases, management systems are employed to facilitate human managers who supervise operations of the elements in the network. For example, networks may operate performance management to enhance network performance, configuration management to monitor and manage network configurations for interoperability between network elements, accounting management to manage availability of resources, fault management to detect and manage network problems, and security management to implement firewalls, authentication and authorization.

The actions carried out by such network management systems may be governed by one or more network management policies, which are abstract expressions about how a particular network is managed. Specific examples of commercial products that support creation and management of management policies for a network include CiscoAssure Policy Networking, and Cisco Quality-of-ServicePolicy Manager, from Cisco Systems, Inc.

In policy management systems, management policies are usually implemented through use of one or more workstations. The workstations are often operated separately than other network elements. One function performed on these workstations when implementing a management policy is to detect when elements of the network are down. In theory, elements that are down have lost connectivity with the network for some reason. The management systems may detect the unreachable elements, and implement management policies that account for or compensate for the unreachable elements. In this context, network elements may include routers, switches, gateways, hubs, bridges, switch controllers, etc.

Typically, management systems identify unreachable elements by repeatedly polling each pertinent element of the network. If a response is not detected from the element polled, the element is assumed to be down or failed. The polling is usually done using protocols such as Simple Network Management Protocol (SNMP), User Datagram Protocol (UDP), or Telnet. Internet Control Message Protocol (ICMP) may also be used to poll elements (i.e. "ping").

Polling requires resources for sending roundtrip communications to the polled devices. Furthermore, protocols such as SNMP and UDP are unreliable on congested networks. Communications sent using these protocols may fail with too much traffic, and little feedback is provided to notify the elements exchanging the communication that the communication failed.

The result is that using polling to query managed devices often generates inaccurate results regarding the health of a network. Elements of the network may be indicated as failed, when in fact the system was too congested to be able to poll that element using a protocol such as SNMP or UDP.

In addition, the polling performed on the managed devices adds to network congestion, and consumes network resources. The managed devices that are polled to detect the health of the network also add overhead and cost to operation of the network.

Based on the foregoing, there is a clear need for an efficient manner to determine the health of a network.

There is a specific need to accurately detect whether network elements are down or unavailable for the purpose of implementing a management policy.

SUMMARY OF THE INVENTION

Aspects of the invention provide a method and apparatus for managing a network using link state information. According to an aspect, link state information for network elements is accessed to determine whether any network elements are unreachable on the network. A management policy is configured to account for any unreachable network elements.

The link state information may be accessed from a management device, network element, or router. In one implementation, the link state information is provided as an inherent feature of using a link state protocol and/or router.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for managing networks using link state information is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

A. Overview

Embodiments of the invention provide for managing network elements of a network using link state information. In an embodiment, the managed network includes a plurality of network elements that are communicatively coupled to one another. A data structure is accessed that includes information about a link state for individual network elements in the plurality of network elements. The link state information for each network element describes a connection between that network element and at least one network element designated to be connected to that network element. A management policy is configured for the plurality of network elements by using the data structure to detect if any of the plurality of network elements is unreachable from another network element.

In one embodiment, the link state information is collected at a network management system using a link state protocol, based on values that are created and maintained locally in each network element. For example, the link state information may be obtained using a link state protocol from link state tables that are maintained in a router for the purpose of enabling the router to select a next hop for a path by selecting a next hop router that is on an active link. In a managed device that uses SNMP, the link state information may be maintained in an existing Management Information Base (MIB). Such link state information is initially created and managed locally, at the network element, based on its immediate and local knowledge of the state of its links to other network elements, and then conveyed to the network management system using a link state protocol.

Using these embodiments, network elements may be managed with more accurate assumptions regarding the health of a network. Specifically, a management device may configure policies for network elements to account for unreachable network elements. The managed device does not have to poll network elements individually to identify that a network element is unreachable. As such, traffic congestion does not cause the managed device to configure a policy that mistakenly accounts for a network element as being unreachable, when in fact the network device is reachable. In particular, because the link state information is created and managed locally, and collected at the network management system using a reliable link state protocol, its accuracy and validity is not affected by the inherent unreliability of protocols such as UDP during polling. If congestion is sufficient to disrupt the link state protocol, the affected element(s) would, in fact, become unreachable. Furthermore, by using link state information, the management device avoids adding to traffic congestion on a network. Collecting the link state information may be an inherent aspect of the network, so that accessing such information does not add to traffic or overhead.

Network elements may also include routers, switches, gateways, hubs, bridges, switch controllers. Network elements may be managed, configured and/or controlled by managed devices. Managed devices may also include clients that can perform some networking functions for the network. The term interconnected or communicatively coupled means that two or more elements can exchange communications, either directly or indirectly. Specifically, interconnected network elements may exchange communications with no intermediate elements or components, or through the use of intermediate elements and components that forward a communication intended for a recipient.

A link state is the connectivity status of the network or the elements within the network. A link state of a network element describes whether the network element is connected to adjacent network elements. Link state information is information that describes the link state. The information may be indirect such as in the form of network addresses for network elements that are reachable. The information may also be direct, such as in the form of coded values that identify a particular state of a particular link.

In conventional usage, link state information is stored and processed by routers on a network. A router use the link state information to determine routes for communication packets that are processed by that router. The router may select a path for a communication packet by comparing network distances to the next hop or destination of the communication packet.

In contrast to conventional usage, embodiments of the invention use link state information to determine whether network elements are reachable to management devices of a network. The use of link state information in this manner may substitute or reduce the need for the management devices to determine the health of the network elements by consuming bandwidth and resources to continuously poll the network elements.

A network element that is unreachable means that the network element cannot be contacted if a communication is sent to that network element. An unreachable network element may be failed, overloaded, disconnected, or overcongested. If a network element is determined to be unreachable, it does not necessarily mean that the network element is in fact unreachable. Specifically, soon after the element's reachability has changed, other elements may have a stale, inaccurate view of the device's reachability. The determination that the network element is unreachable may be false, but the management device or other components may use the determination to configure a management policy on the assumption that the determination is true.

A management policy may be configured on network elements using an element management system or network management system. The term configured means that the policy may be initiated, implemented, discontinued, modified or reconfigured. The element management system may configure the policy on one or more of the network elements in the network. Examples of policies that can be implemented include a Quality-of-Service policy and a firewall policy. Other policies for features such as performance, fault, security, and configuration management may also be provided. According to an aspect, an element management system may be an integral component of the network. Alternatively, an element management system may be external to the network elements.

According to an embodiment, a data structure is maintained that includes information about a link state for each network element in the plurality of network elements. The data structure may be updated using information exchanged between adjacent network elements.

Adjacent network elements are network elements that are designated to be directly connected to one another. That is, adjacent network elements communicate with one another without intermediate network elements.

Another embodiment may provide for managing a network having a plurality of network elements. The network elements are configured to be interconnected to one another. The network elements include a first router that maintains link state information about the interconnectivity of the plurality of network elements.

The link state information may be accessed from the first router. A management policy is configured for the plurality of network elements by subsequently determining if one or more of the plurality of network elements is unreachable. The determination is made using the link state information from the first router.

Another element provides that the plurality of network elements are operated so that at least some of the network elements automatically provide link state information about connections with adjacent network elements. This may require that the network elements be operated using a protocol that causes network elements to generate link state information. Examples of such link state protocols include Open Shortest Path First (OSPF) protocol, and Enhanced Internet Gateway Routing Protocol (EIGRP).

Still further, the protocol may be implemented to maintain a structure such as a link state map as an inherent feature of the protocol. The link state map may be maintained on a router that manages operations of the network elements under the protocol.

Alternatively, the link state map may be maintained on one of the network elements in the network, or compiled from separate pieces of link state information provided by multiple network elements in the network.

B. System Description

Figure 1:
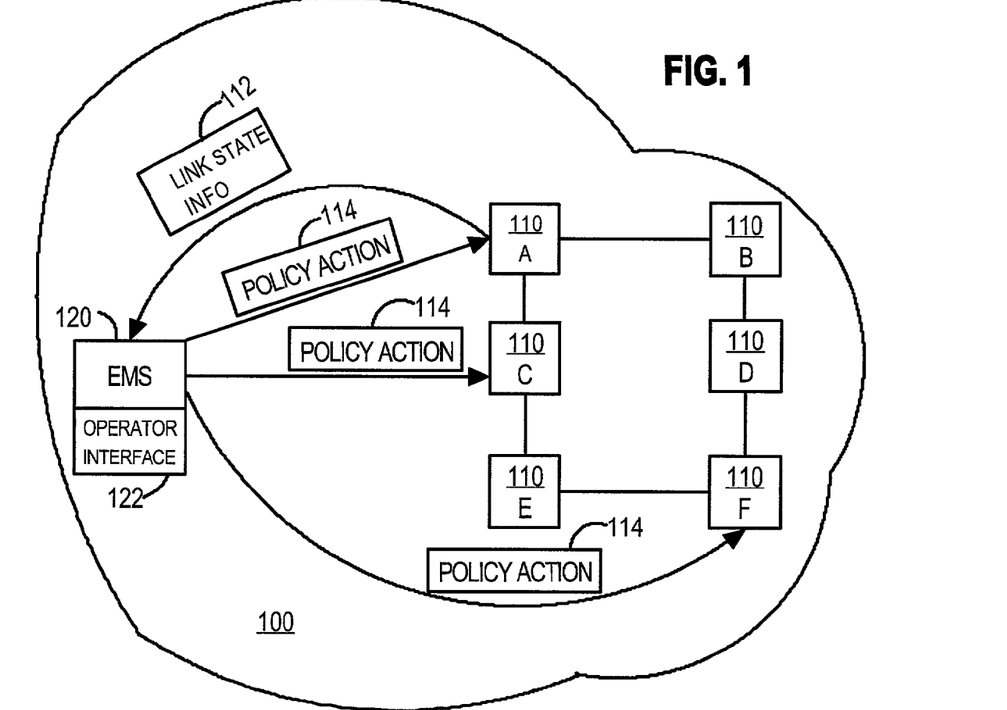
FIG. 1 is a block diagram that illustrates an overview of a network where link state information is used to manage network elements.

FIG. 1 is a block diagram that illustrates an overview of a network where link state information is used to manage network elements.

A network 100 includes a plurality of network elements 110. The network elements 110 are interconnected by one or more links. An element management system (EMS) 120 manages one or more of the network elements 110.

In an embodiment, the network elements 110 are operated under a link state protocol. As a result, the network elements 110 are configured to automatically provide link state information. The link state information from each network element 110 provides information about the status of the connection between that network element 110 and an adjacent network element. For example, the link state information for network element A may provide the status of element A's connection with elements B and C.

For some link state protocols such as OSPF and EIGRP, each network element 110 broadcasts to adjacent elements the link state information for that network element. If one network element fails, an adjacent network element will detect the failure and broadcast it. The network elements 110 that are operational pass the link state information on to other network elements 110.

Alternatively, the link state information may be generated and passed on to a router that is authoritative to a network management workstation. The router for the network elements 110 may access the link state information to know which network elements are operational for purpose of routing communications to the network elements 110.

The generation of link state information and its maintenance on network elements 110 or routers can be inherent functions of a link state protocol. An embodiment provides that the link state information is used to manage one or more network elements. In an embodiment such as shown with FIG. 1, link state information may be maintained on one of the network elements 110, or on EMS 120.

The EMS 120 configures a policy to manage network elements 110. The policy may be configured by accessing link state information 112 for network elements 110. The link state information 112 may be accessed from one of the plurality of network elements 110, or from a router such as described with FIG. 2. The link state information 112 provides the status of the links for all of the network elements 110.

Under one embodiment, EMS 120 receives the link state information 112 by communicating with only one network element 110. This allows for EMS 120 to know the status of each network element 110 without having to expend resources and congest traffic by polling or otherwise communicating with each network element 110 separately.

In response to accessing the link state information, EMS 120 signals policy actions 114 to one or more network elements 110. The policy actions 114 may configure a policy for network 100. For example, if one of the network elements 110 is detected as being down, EMS 120 may communicate policy actions 114 to other network elements 110 to account for the unreachable network element. The workload of the unreachable network element may be distributed to other network elements 110. Adjacent network elements may be configured to increase monitoring of the unreachable network element to see if the unreachable network element can recover.

In an embodiment, EMS 120 provides an operator interface 122 that provides feedback about the status of the network elements 110. For example, EMS 120 may visually inform an operator that one or more network elements 110 were detected as being unreachable. The operator interface 122 may also receive commands or instructions that configure the policy being implemented on one or more of the network elements 110.

Figure 2:
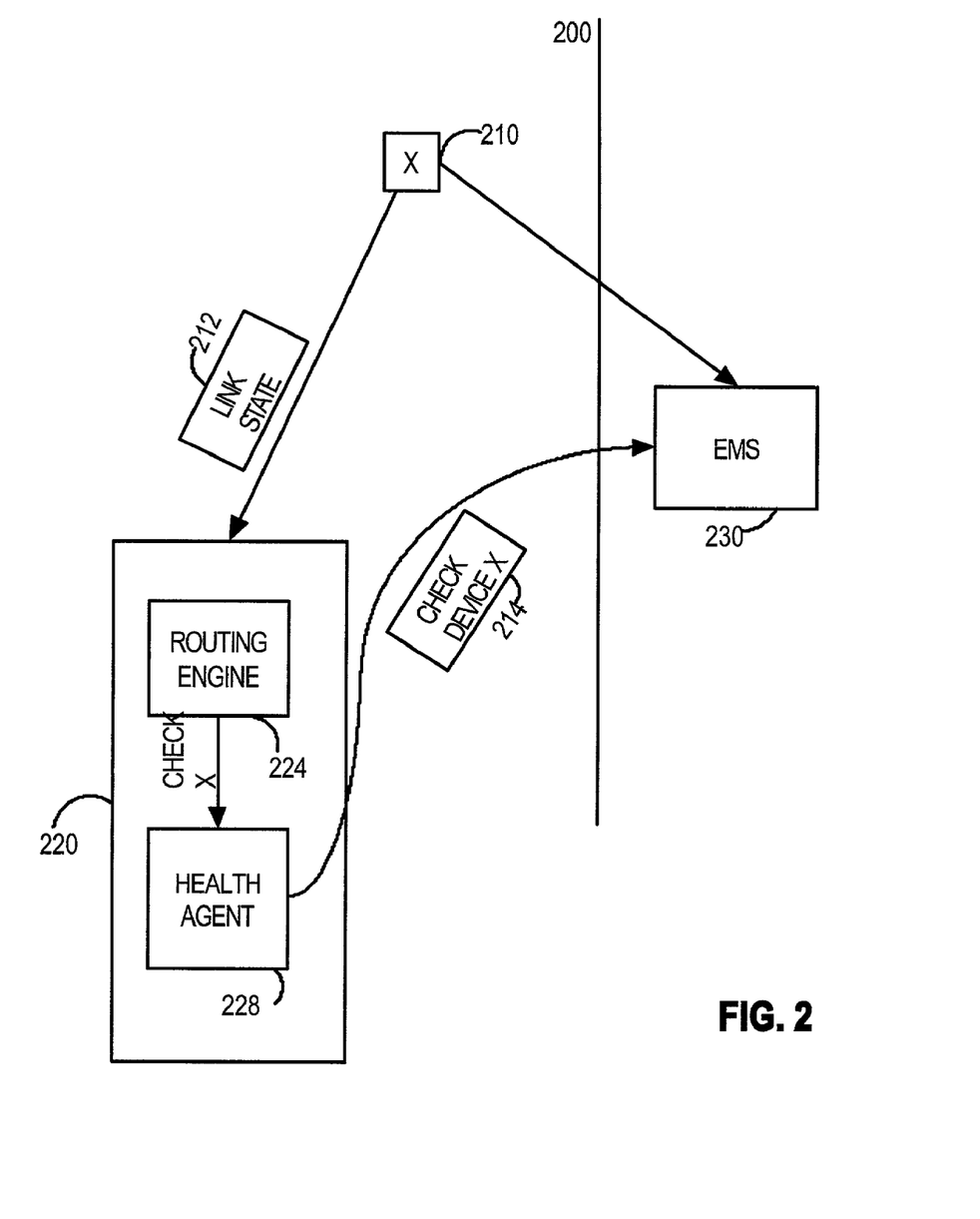
FIG. 2 is a block diagram that illustrates an overview of a network where link state information from a router is used to manage network elements

FIG. 2 is a block diagram that illustrates an overview of a network where link state information from a router is used to manage network elements.

A network 200 includes a device 210 that is part of an interconnected group of network elements. The device 210 may be managed by EMS 230, operating on a workstation connected to or within the network 200. A router 220 includes a routing engine 224. The router 220 is also configured to include a health agent 228 that communicates with EMS 230.

The routing engine 224 of router 220 functions to route communications such as data packets to different destinations within network 200. The routing engine 224 receives link state information 212 from the interconnected network elements of network 200 as an inherent feature of the protocol being employed. The link state information 212 indicates which network elements 110 are reachable. The health agent 228 reports the status of reachable and/or unreachable items to EMS 230.

In an embodiment, EMS 230 is initially configured to query routing engine 224 to receive a list of managed devices within network 200. These managed devices correspond to network elements that provide link state information to routing engine 224. The EMS 230 maintains a list of managed devices within network 200 from the initial query. Periodically, EMS 230 queries routing engine 224 to update the list.

There are several ways in which EMS 230 can use link state information 212 received from routing engine 224 to manage devices within network 200. In one embodiment shown, router 220 is equipped with health agent 228 to receive or process link state information 212 that indicates one of the network elements of network 200 is unreachable. The health agent 228 signals a communication 214 to EMS 230 that includes information derived from link state information 212.

For example, link state information 212 may indicate device 210 is unreachable. The health agent 228 may then send a communication 214 to EMS 230 to notify or instruct EMS 230 check device 210. Alternatively, EMS 230 may assume device 210 is unreachable using link state information provided in communication 214. The EMS 230 may then configure the management policy based on that assumption.

It is also possible for a combination of polling and notification to be used. For example, EMS 230 may still poll device 210, but less frequently, relying in part on health agent 228 notifying EMS 230 of device 210 being unreachable. Also, EMS 230 may use link state information 228 to confirm that device 210 is unreachable after polling the device.

In another embodiment, EMS 230 queries router 220 about specific devices within network 200. The queries are to determine whether those devices or reachable for purpose of receiving communications from EMS 230. For example, EMS 230 may be configured to implement a policy for device 210. The EMS 230 may periodically query routing engine 224 to determine whether device 210 is operational. EMS 230 may even poll device 210, but the polling is made to a device that is outside of network 200. Furthermore, EMS 230 needs to communicate with only one device to check on the status of multiple devices within network 200. Therefore, the chance that network congestion would result in receiving false information is reduced by polling router 220, rather than polling individual network elements of network 200.

According to another embodiment, health agent 228 sends EMS 230 link state information for network elements of network 200 on a periodic basis. The link state information may be in the form of addresses for reachable network elements. The EMS 230 may be able to determine which network elements are not reachable for implementing the management policy.

A protocol for establishing communications between EMS 230 and router 220 may be established by enabling EMS 230 to declare itself to router 220 as another router. Other protocols may be implemented to enable link state information to be easily exchanged between router 220 and EMS 230.

Still further embodiments allow for health agent 228 or router 220 to provide a summary of link state information, such as a table or other data structure that indicates the status of network elements of network 200.

C. Methods for Implementing Embodiments

Figure 3:
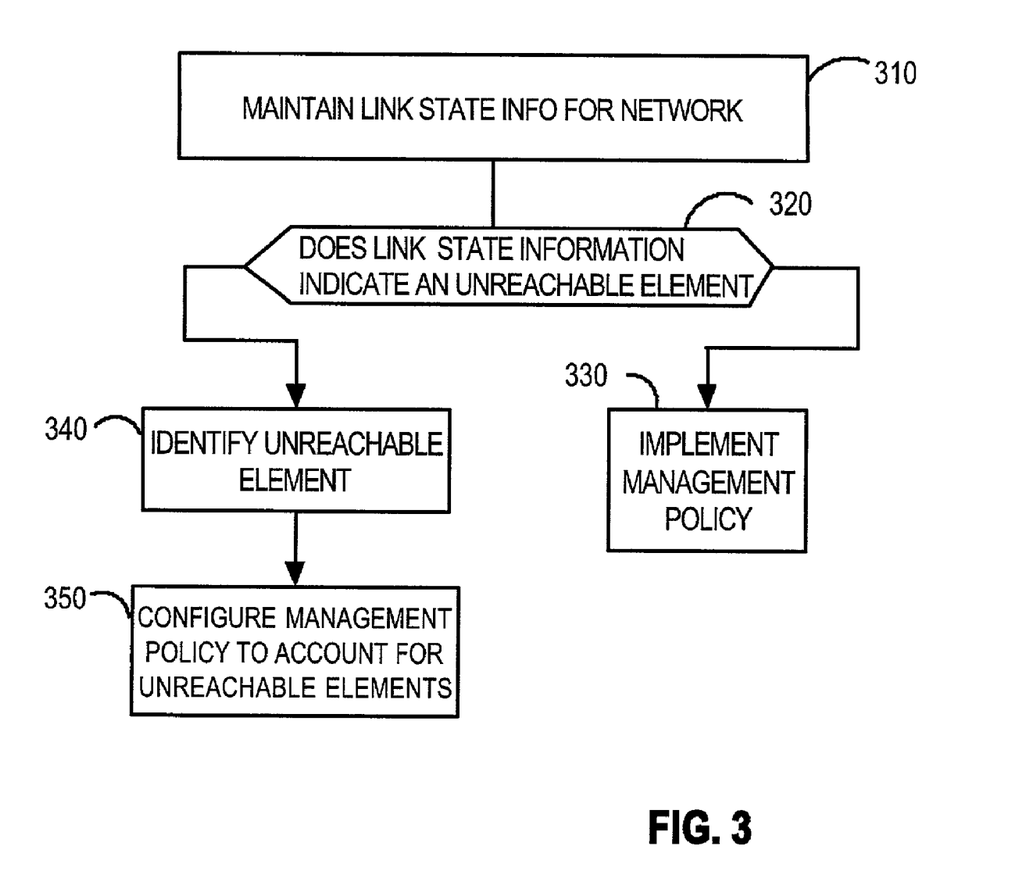
FIG. 3 is a flow chart illustrating a method for accessing link state information to configure a management policy.
Figure 4:
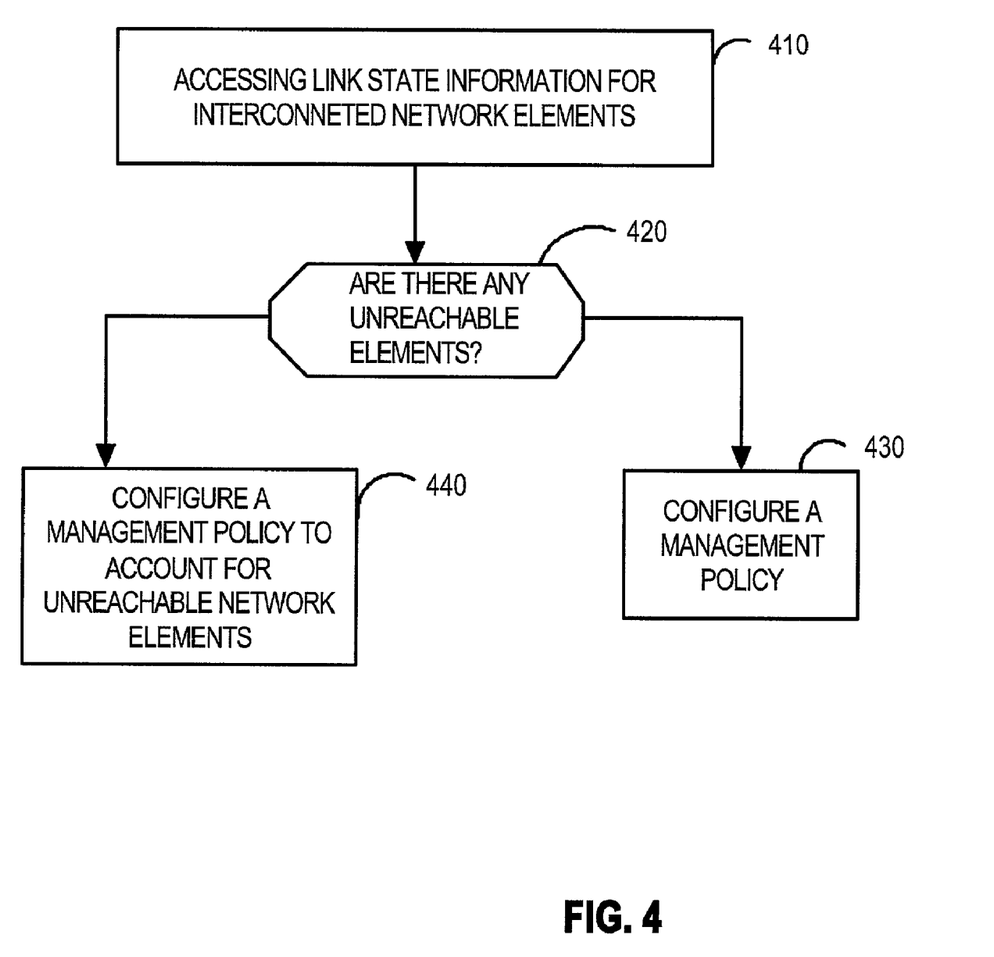
FIG. 4 is a flow chart illustrating a method for accessing link state information to identify the link status a network

FIG. 3 illustrates a method for accessing link state information to configure a management policy. FIG. 4 illustrates a method for accessing link state information to identify the link status of a network FIG. 5 is a flow chart illustrating a method for using link state information to configure a management policy on a network operating a link state protocol.

Figure 5:
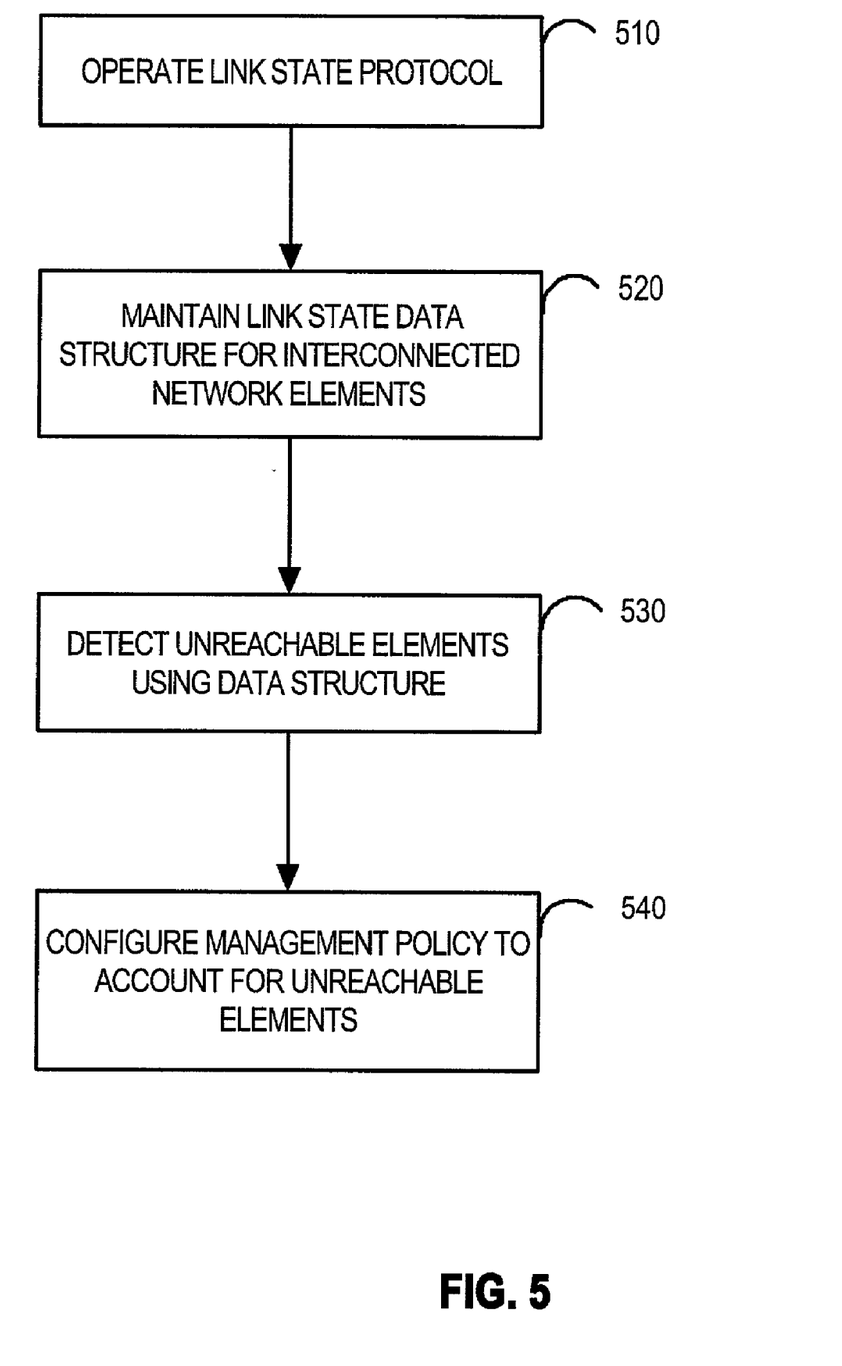
FIG. 5 is a flow chart illustrating a method for using link state information to configure a management policy on a network operating a link state protocol.

For purpose of illustrating a simple example, the methods of FIG. 3, FIG. 4, and FIG. 5 are described herein in the context of FIG. 1 or FIG. 2, and elements of FIG. 1 or FIG. 2. However, the methods of FIG. 3, FIG. 4, and FIG. 5 are not limited to that specific context, but are broadly applicable for purposes identified in this disclosure.

FIG. 3 is a flow chart illustrating a method for accessing link state information to configure a management policy. In step 310, link state information is maintained for a network. The link state information describes the link state of each network element in the network. The link state information indicates whether those network elements are reachable or unreachable by a management device.

In step 320, a determination is made as to whether the link state information indicates whether one of the network elements 110 has become unreachable. The determination may be general so as to not uniquely identify which network elements 110 are unreachable. The determination may be made by receiving link state information that describes the status of the interconnected network elements 110 as a whole. The link state information may be periodically updated by broadcasts from the network elements. The link state information may determine unreachable items exist if network elements indicate that one or more of their adjacent network elements are unreachable.

If step 320 determines that the link state information indicates all of the network elements are reachable, step 330 provides that the management policy is implemented without provisions for an unreachable item.

If step 320 determines that there is at least one network element 110 that is unreachable, then step 340 provides that the unreachable network element(s) are identified. This may be performed by polling each network element in response to detecting that there was an unreachable element.

Step 350 provides that the management policy accounts for the identified unreachable element(s). This may involve signaling policy actions to other network elements to account for or accommodate the unreachable item. The management policy may also signal policy actions to confirm through polling that the identified network element is unreachable. Alternatively, an operator may be informed of the unreachable item.

An embodiment described with FIG. 3 provides that the unreachable network element is identified in a separate step from the determination of whether any unreachable items exist. In such an embodiment, the determination that a network element is unreachable is general, and not specific to any one network element. For example, step 320 may determine only that a chain of interconnected network elements 110 in the network 100 is broken. A subsequent determination is required to identify the particular network element 110 that is unreachable.

Figure 6:
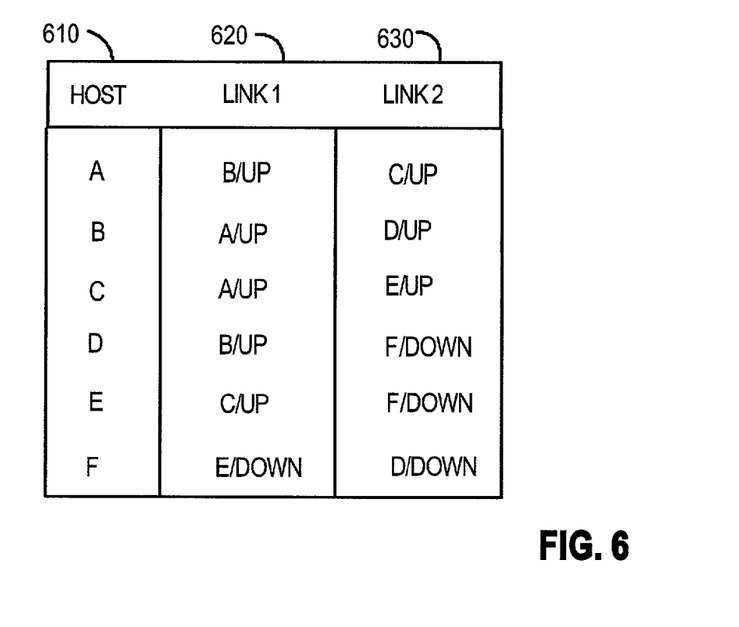
FIG. 6 shows an illustrative link state data structure for identifying link states of individual network elements in a network.

In another embodiment, the determination of whether any unreachable network elements exist is performed in conjunction with identifying all of the network elements 110 that are unreachable or reachable. This may be accomplished by maintaining a link state data structure that has information about all of the link states. An example of such a data structure is shown in FIG. 6.

FIG. 4 is a flow chart illustrating a method for accessing link state information to identify the link status of a network. In step 410, link state information is accessed for interconnected network elements 110 of network 100.

In one embodiment, link state information may be accessed from a device such as a router. The router may be internal or external to network 100. In another embodiment, link state information is accessed from one of the network elements 110. Still, another embodiment provides that EMS 120 receives and maintains link state information broadcasted or announced from other network elements 110.

In step 420, a determination is made as to whether there are any unreachable network elements. This step may be performed when link state information is periodically updated. Link state information may be updated by compiling information from periodic announcements and broadcasts about the link state of each network element 110 in network 100.

If step 420 determines that there are no unreachable items, then step 430 provides that a management policy for network elements 110 is configured by EMS 120 with no adjustments or accounting for unreachable items.

If step 420 determines that there are unreachable items, then step 440 provides that a management policy for network elements 110 is configured to account for the unreachable network elements. For example, policy actions 114 (FIG. 1) may be signaled to cause other network elements 10 to perform the functions of the unreachable network element 10. The policy actions 114 may also be used to communicate the link state information to an operator or human manager.

FIG. 5 is a flow chart illustrating a method for using link state information to configure a management policy on a network operating a link state protocol. In step 510, elements of network 100 are operated using a link state protocol. Link state protocols require network elements to provide link state information as an automatic aspect of their operation. Examples of link state protocols include OPSF and EIGRP. Elements operating under a link state protocol may be employed with router 220.

In step 520, a link state data structure is maintained for interconnected network elements of network 100. The link state data structure may provide information that indicates whether specific network elements are reachable and/or unreachable. For network 200, link state data structure may be maintained with periodic communications with router 220. For network 100, one or more elements may maintain link state information for elements of network 100, or provide that information to EMS 120, which maintains the link state data structure.

In step 530, unreachable elements are detected using the link state data structure. For example, in network 200, EMS 230 may receive an update to the link state data structure from router 220 that indicates one of the elements of network 200 has changed link states, and is now unreachable. In network 100, one of the network elements 110 may receive the update to the link state data structure, and EMS 120 may be notified of that update.

In step 540, a management policy is configured to account for unreachable network elements. The management policy may be implemented by EMS 230. If a management policy is in operation before one of the network elements becomes unreachable, the EMS 230 may reconfigure the management policy to account for the unreachable network element. For example, tasks performed by an unreachable element may be terminated and/or transferred to other network elements.

D. Illustrative Link State Structures

FIG. 6 shows an illustrative link state data structure for identifying link states of individual network elements in a network.

A link state data structure 600 as shown may be compiled, maintained and/or updated using link state information provided by network elements operated under a link state protocol. In the example provided, link state data structure 600 provides link state information for a configuration of network elements 110 shown in FIG. 1. The link state data structure 600 may be maintained on router 220 (FIG. 2) for the network, one of the network elements 110, or on EMS 120 that manages network elements 110.

The link state data structure 600 includes a first column 610 listing identifiers to each network element 110 in network 100. A plurality of adjacent columns are provided to describe a link and link state with another network element. Each interconnected network element 110 has one or more links. In an example such as provided with FIG. 1, each network element 110 includes two adjacent network elements. A greater or lesser number of adjacent network elements may be provided for each network element 110.

The second column 620 and third column 630 identify the adjacent network elements for each network element listed in first column 610. The second column 620 and third column 630 also list the connectivity status for the adjacent network elements of each network element listed in first column 610. For example, HostA has HostB and HostC as adjacent network elements (See FIG. 1). As shown by FIG. 6, HostD and HostE have link status information that indicates HostF is unreachable.

The link and link status information may be represented in different ways. It is possible for the connectivity status to be integrated with the link identifier. For example, columns 620 and 630 may carry addresses of network elements 110. If the addresses are present in columns 620 and 630, the implication is that the item is reachable. The link status may also be separate from the identifier of the link. For example, columns 620 and 630 may list addresses of adjacent elements whether those elements are connected or not. A separate indication may be used to identify whether the link is reachable or unreachable.

The specific table format of link state data structure 600 is provided as an example, and is not required. Any suitable mapping of host names to links may be used.

E. Hardware Diagram

Figure 7:
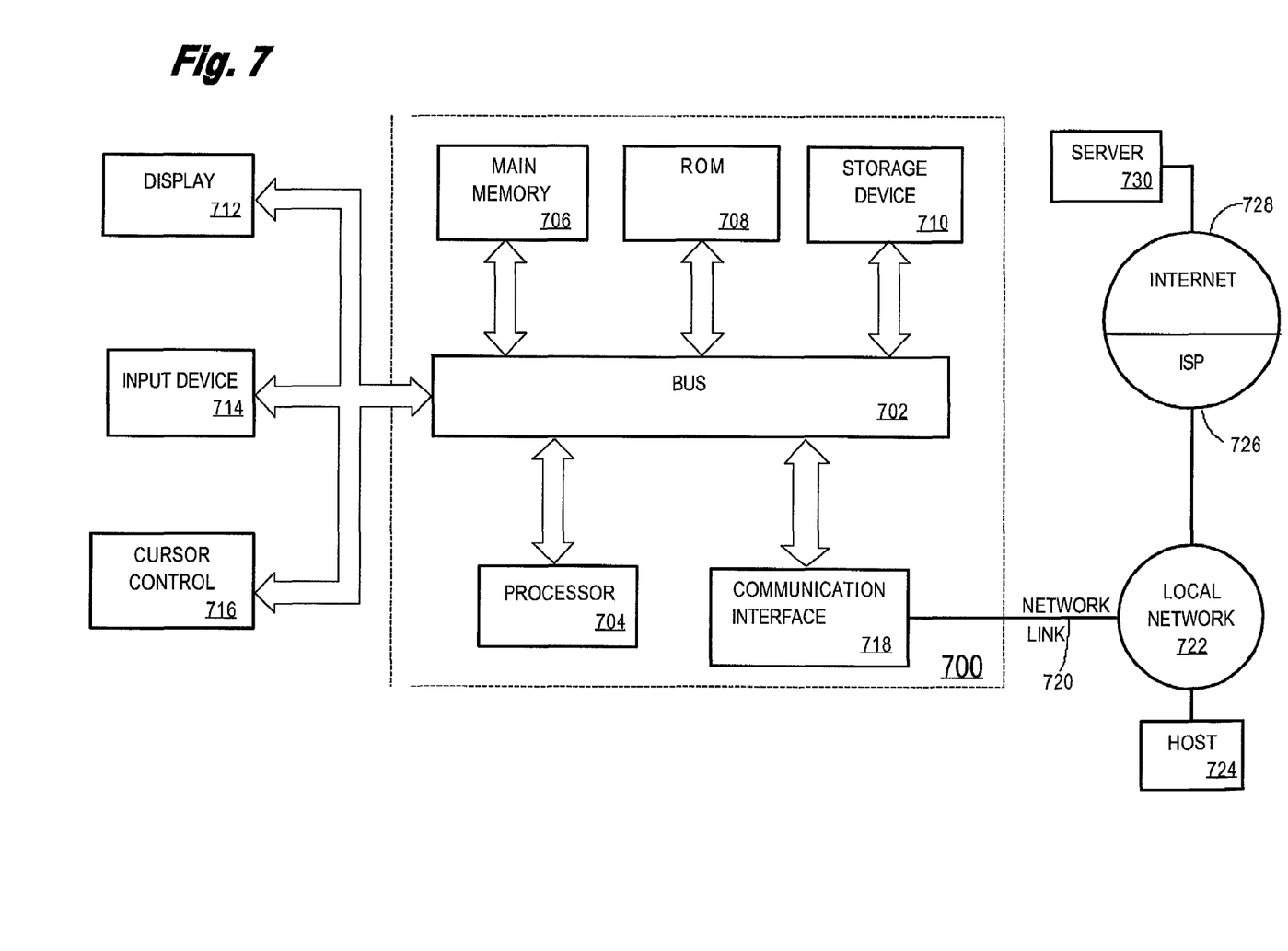
FIG. 7 is a block diagram that illustrates a computer system upon which an embodiment may be implemented.

FIG. 7 is a block diagram that illustrates a computer system upon which an embodiment may be implemented.

Computer system 700 includes a bus 702 or other communication mechanism for communicating information, and a processor 704 coupled with bus 702 for processing information. Computer system 700 also includes a main memory 706, such as a random access memory ("RAM") or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory ("ROM") 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube ("CRT"), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for managing elements of a network using link state information. According to one embodiment of the invention, managing elements of a network using link state information is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, nonvolatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network ("ISDN") card or a modem to provide a data communication connection to a corresponding type of telephone line. As another example, communication interface 718 may be a local area network ("LAN") card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider ("ISP") 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for managing elements of a network using link state information, as described herein.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for managing a network, the network including a plurality of network elements that are configured to be interconnected to one another, the method comprising:
   a management device receiving link state information about a link state for each network element in the plurality of network elements, wherein only data that was inherently communicated according to a routing protocol, between two or more of the plurality of network elements, was used to generate the link state information;
   the management device determining whether any of the plurality of network elements are unreachable, based only on the link state information; and
   the management device configuring a management policy for at least one of the network elements, the management policy identifying if any of the plurality of network elements are determined as being unreachable;
   wherein the management device is not a router.

2. The method of claim 1, wherein configuring a management policy includes communicating with one or more of the network elements to account for any of the plurality of network elements that were detected as being unreachable.

3. The method of claim 1, wherein configuring a management policy includes signaling to an operator interface an indication that one or more network elements are unreachable.

4. The method of claim 1, further comprising updating a data structure that includes the link state information for each network element in the plurality of network elements.

5. The method of claim 1, further comprising updating a data structure that includes the link state information for each network element in the plurality of network elements by receiving a broadcast from at least some of the plurality of network elements, the broadcast from each network element containing information about the link state for each network element in the plurality of network elements.

6. The method of claim 1, wherein configuring a management policy includes detecting that at least one of the plurality of network elements is unreachable, and then identifying which one of the network elements in the plurality of network elements are unreachable.

7. The method of claim 1, wherein configuring a management policy includes detecting that at least one of the plurality of network elements is unreachable, and then polling one or more selected network elements in the plurality of network elements to identify which one of the plurality of network elements are unreachable.

8. The method of claim 1, wherein the routing protocol is Open Shortest Path First (OSPF) protocol.

9. The method of claim 1, wherein the routing protocol is Enhanced Internet Gateway Routing Protocol (EIGRP) protocol.

10. A method for managing a network, the network including a plurality of network elements that are configured to be interconnected to one another, the network including a management device to manage at least one of the network elements using one or more policies, the method comprising:

operating the plurality of network elements using a link state protocol that causes link state information to be generated, wherein only data that was inherently communicated according to the link state protocol, between two or more of the plurality of network elements, was used to generate the link state information; and the management device detecting if any of the network elements are unreachable using only the link state information which is provided by the network elements operating the link state protocol;

wherein the management device is not a router.

11. The method of claim 10, further comprising configuring a management policy for at least one of the network elements using the management device, the management policy identifying if any of the plurality of network elements are detected as being unreachable.

12. The method of claim 10, further comprising communicating with one or more of the network elements to implement a management policy that accounts for any of the plurality of network elements that were detected as being unreachable.

13. The method of claim 10, further comprising signaling an indication to an operator interface that one or more network elements are unreachable.

14. The method of claim 10, wherein detecting if any of the network elements are unreachable includes detecting a break in the plurality of network elements being interconnected to one another.

15. The method of claim 10, wherein detecting if any of the network elements are unreachable includes detecting a break in the plurality of network elements being interconnected to one another, and then communicating with each network element to identify which one or more of the network elements are unreachable.

16. A method for managing a network, the network including a plurality of network elements that are configured to be interconnected to one another, the method comprising:

a management device receiving link state information automatically from the plurality of network elements operating a link state protocol, the link state information from each network element indicating a status of a connection with an adjacent network element in the plurality of network elements, wherein only data that was inherently communicated according to the link state protocol, between two or more of the plurality of network elements, was used to generate the link state information; and the management device configuring a management policy for the plurality of network elements by subsequently determining, based only on the link state information, if one or more of the plurality of network elements are reachable;

wherein the management device is not a router.

17. The method of claim 16, wherein the link state protocol is Open Shortest Path First (OSPF) protocol.

18. The method of claim 16, wherein the link state protocol is Enhanced Internet Gateway Routing Protocol (EIGRP) protocol.

19. The method of claim 16, further comprising determining routes for communication packets to the plurality of network elements using the link state information.

20. A computer system for managing a network, the network including a plurality of network elements, the computer system comprising:

a processor;

a network interface to receive, at a management device that is not a router, link state information for the plurality of network elements, wherein only data that was inherently communicated according to a routing protocol, between two or more of the plurality of network elements, was used to generate the link state information; and a storage medium coupleable to the processor, the storage medium carrying instructions for:

determining, at the management device, whether any of the plurality of network elements are unreachable, based only on the link state information, and for configuring a management policy for at least one of the network elements, the management policy identifying if any of the plurality of network elements are determined as being unreachable.

21. The computer system of claim 20, wherein the instructions for configuring a management policy includes instructions for communicating with one or more of the network elements to account for any of the plurality of network elements that were detected as being unreachable.

22. The computer system of claim 20, wherein the instructions for configuring a management policy includes instructions for signaling to an operator interface an indication that one or more network elements are unreachable.

23. The computer system of claim 20, wherein the storage medium carries instructions for updating a data structure that includes link state information for each network element in the plurality of network elements.

24. A computer-readable medium for managing a network, the network including a plurality of network elements that are configured to be interconnected to one another, the computer-readable medium carrying instructions for performing:

receiving, at a management device, link state information about a link state for each network element in the plurality of network elements, wherein only data that was inherently communicated according to a routing protocol, between two or more of the plurality of network elements, was used to generate the link state information;

determining, at the management device, whether any of the plurality of network elements are unreachable, based only on the link state information; and configuring, from the management device, a management policy for at least one of the network elements, the management policy identifying if any of the plurality of network elements are detected as being unreachable;

wherein the management device is not a router.

25. The computer-readable medium of claim 24, wherein the computer-readable medium includes instructions for communicating with one or more of the network elements to account for any of the plurality of network elements that were detected as being unreachable.

26. The computer-readable medium of claim 24, wherein instructions for configuring a management policy include instructions for signaling to an operator interface an indication that one or more network elements are unreachable.

27. The computer-readable medium of claim 24, wherein the computer-readable medium includes instructions for updating a data structure that includes the link state information for each network element in the plurality of network elements.

28. The computer-readable medium of claim 24, wherein the computer-readable medium includes instructions for updating a data structure that includes the link state information for each network element in the plurality of network elements by receiving a broadcast from at least some of the plurality of network elements, the broadcast from each network element containing information about the link state for each network element in the plurality of network elements.

29. The computer-readable medium of claim 24, wherein instructions for configuring a management policy includes instructions for detecting that at least one of the plurality of network elements is unreachable, and then identifying which one of the network elements in the plurality of network elements are unreachable.

30. The computer-readable medium of claim 24, wherein instructions for configuring a management policy include instructions detecting that at least one of the plurality of network elements is unreachable, and then polling one or more selected network elements in the plurality of network elements to identify which one of the plurality of network elements are unreachable.

31. A computer system for managing a network, the network including a plurality of network elements that are configured to be interconnected to one another, the computer system comprising:
    means for receiving, at a management device, link state information about a link state for each network element in the plurality of network elements, wherein only data that was inherently communicated according to a routing protocol, between two or more of the plurality of network elements, was used to generate the link state information;
    means for determining, at the management device, whether any of the plurality of network elements are unreachable, based only on the link state information; and
    means for configuring, from the management device, a management policy for at least one of the network elements, the management policy identifying if any of the plurality of network elements are detected as being unreachable;
wherein the management device is not a router.

* * * * *